(12) United States Patent
Malkin

(10) Patent No.: US 6,247,054 B1
(45) Date of Patent: *Jun. 12, 2001

(54) METHOD AND APPARATUS FOR REDIRECTING PACKETS USING ENCAPSULATION

(75) Inventor: Gary Malkin, Lowell, MA (US)

(73) Assignee: Nortel Networks Limited, Montreal (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/822,848

(22) Filed: Mar. 24, 1997

(51) Int. Cl.⁷ .......................... G06F 15/173; G06F 15/16
(52) U.S. Cl. .......................................... 709/225; 709/219
(58) Field of Search ................... 395/200.31, 200.32, 395/200.33, 200.36, 200.49, 200.55, 200.56; 709/201, 202, 203, 206, 219, 225, 226

(56) References Cited

U.S. PATENT DOCUMENTS

| 5,426,427 | * | 6/1995 | Chinnock et al. | 340/827 |
| 5,706,427 | * | 1/1998 | Tabuki | 395/187.01 |
| 5,708,780 | * | 1/1998 | Levergood et al. | 395/200.12 |
| 5,764,890 | * | 6/1998 | Glasser et al. | 395/188.01 |
| 5,774,660 | * | 6/1998 | Brendel et al. | 395/200.31 |
| 5,781,550 | * | 7/1998 | Templin et al. | 370/401 |
| 5,812,776 | * | 9/1998 | Gifford | 395/200.47 |

* cited by examiner

Primary Examiner—Glenton B. Burgess
Assistant Examiner—Kenneth W. Fields
(74) Attorney, Agent, or Firm—Blakely Sokoloff Taylor & Zafman LLP

(57) ABSTRACT

A method and apparatus for redirecting packets using encapsulation techniques. In one embodiment, an Internet subscriber transmits an Internet service request to a Network Access Server (NAS). The service request is transmitted in a first packet. The NAS analyzes the first packet to determine whether the service request exceeds the subscriber's internet subscription. If the request exceeds the subscriber's subscription, the NAS encapsulates the first packet into a second packet and redirects the second to a redirection server. The packet is encapsulated to preserve the address of the original destination of the service request. Upon receipt, the redirection server generates a reply to the internet service request which specifies why the service request was denied. The redirection server also substitutes the address of the original destination as the source of the reply message to allow the reply message to be received as reply from the original destination.

46 Claims, 3 Drawing Sheets

METHOD AND APPARATUS FOR REDIRECTING PACKETS USING ENCAPSULATION

FIELD OF THE INVENTION

The present invention relates to computer networking systems, and in particular, the invention relates to redirecting packets using encapsulation.

BACKGROUND OF THE INVENTION

Many Internet Service Providers (ISPs) offer multiple levels of service, charging a different fee for each service level. For example, a subscriber of an ISP may subscribe to e-mail only, connection access (i.e., Telnet and FTP), or full access which would allow access to the World Wide Web (WWW).

Typically, the ISPs are configured so that a subscriber cannot use a service which is not included in the subscriber's subscription. The Network Access Servers (NAS), which provide point-of-presence dial-in access for the ISPs, may provide filtering to prohibit a subscriber from accessing services not included in the subscriber's subscription. When a NAS detects a subscriber attempting to exceed their allowed service level, the NAS typically discards the subscriber's packet (which contains a request for the service), and returns a simple "cannot connect" type message to the subscriber.

As a result, the subscriber is uninformed as to why they are unable to connect or receive their requested service. As such, it would be desirable to return an appropriate application level message to the subscriber providing a more detailed explanation why the requested service is unavailable to the subscriber.

SUMMARY OF THE INVENTION

The present invention provides a method and apparatus for redirecting packets using encapsulation techniques. In one embodiment, an Internet subscriber transmits an Internet service request to a Network Access Server (NAS). The service request is transmitted in a first packet. The NAS analyzes the first packet to determine whether the service request exceeds the subscriber's internet subscription. If the request exceeds the subscriber's subscription, the NAS encapsulates the first packet into a second packet and redirects the second to a redirection server. The packet is encapsulated to preserve the address of the original destination of the service request.

Upon receipt, the redirection server generates a reply to the internet service request which specifies why the service request was denied. The redirection server also substitutes the address of the original destination as the source of the reply message to allow the reply message to be received as reply from the original destination.

BRIEF DESCRIPTION OF THE DRAWINGS

The present invention is illustrated by way of example and not limitation in the figures of the accompanying drawings, and in which.

DETAILED DESCRIPTION

A method and apparatus are described for redirecting application packets using encapsulation techniques. In the following description, numerous specific details are set forth in order to provide a thorough understanding of the present invention. It will be apparent, however, to one of ordinary skill in the art that the present invention may be practiced without these specific details. In other instances, well-known standards, structures, and techniques have not been shown in order not to unnecessarily obscure the present invention.

As discussed above, in the prior art background section, there is a need to provide computer users/ISP subscribers with a more informative message explaining why they are unable to receive their requested Internet service. One approach is to return an appropriate application level message to the subscriber specifying in more detail why the service is unavailable to the subscriber. For example, the application message could indicate to the subscriber that they are attempting to access the WWW, but their subscription to the ISP does not include access to the WWW.

Figure 1:
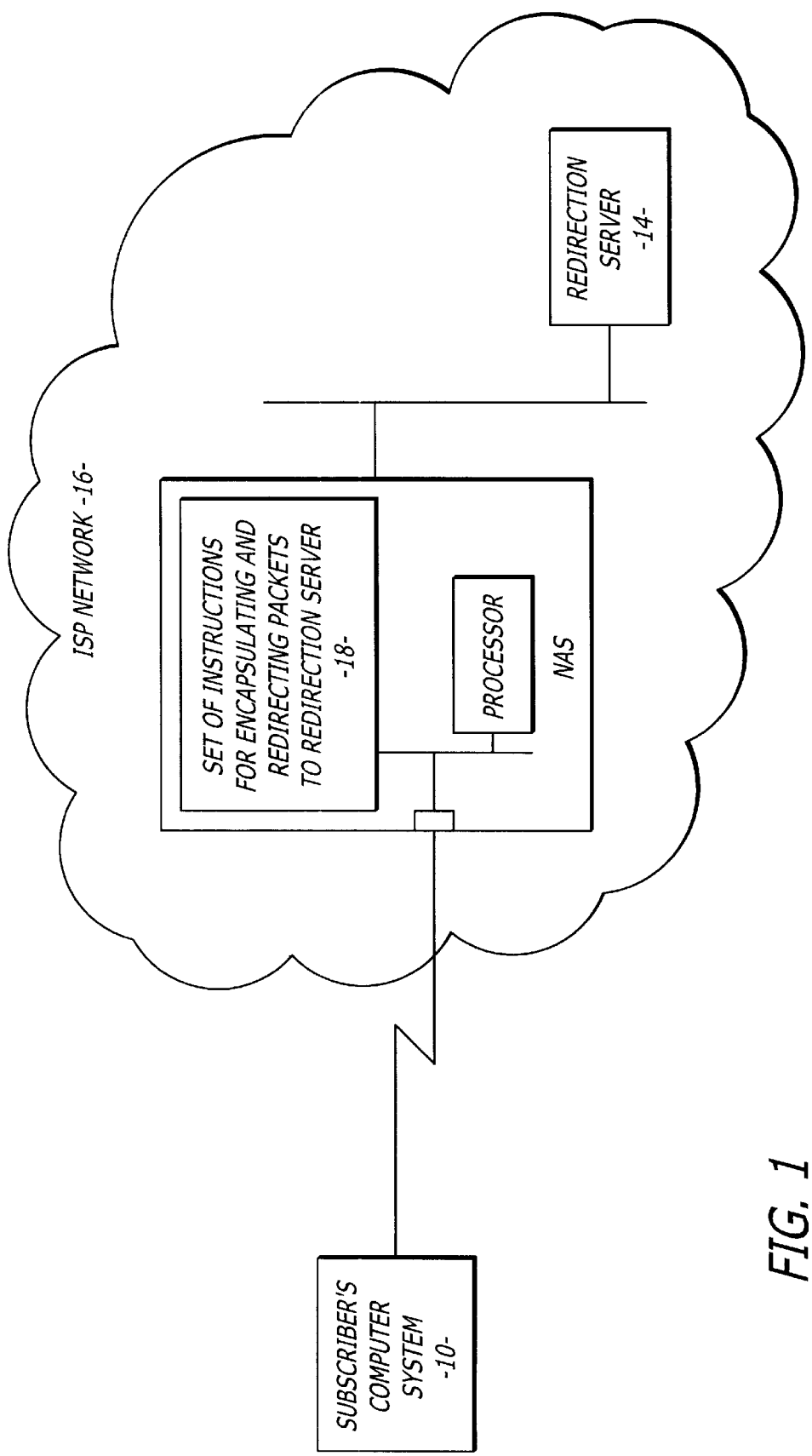
FIG. 1 illustrates a network configuration implementing one embodiment of the present invention.

In order to return such a message, the NAS 12 of the present invention, as shown in FIG. 1, is configured to detect when a service request exceeds a computer operator's subscription. In such a case, the NAS 12 may redirect the subscriber's request (in the form of a packet) to a Redirection Server 14 included the ISP network 16. The Redirection Server will respond to the packet by generating and sending an appropriate application level reply message to the subscriber indicating why the request has been denied.

The message from the Redirection Server will be sent as a "reply" to the subscriber's original service request. The subscriber's computer system, however, will typically expect the reply message to have been sent from the original destination of the subscriber's original service request (e.g., a WWW site).

The reply message from the redirection server will be transferred via packets. The packets typically include data and a header. The header typically specifies the source of the packet (i.e., the redirection server) and the destination of the packet (i.e., the subscriber's computer).

When the subscriber's computer system receives the reply message from the Redirection Server, their computer will typically execute an algorithm to check the integrity of the data in the reply message to determine whether some of the data may have been lost while being transmitted. The algorithm is commonly referred to as a checksum.

The checksum will typically analyze the source and destination addresses provided in the header of the packets. Considering the reply packets sent from the redirection server are being sent as a reply to the subscriber's original service request, the checksum performed by subscriber's computer system will expect the source address of the reply packet to match the destination address of the subscriber's original service request.

As a result, the reply message from the redirection server will most likely fail the checksum because it has been sent from the redirection server, rather than being sent from the destination of the original service request. Therefore, the subscriber's computer system will assume the data of the reply message is faulty and dispose of the reply message. As a result, the subscriber will not receive the message explaining why the original service request was denied.

One solution to the problem is to have the Redirection Server perform a "spoofing" technique. Using the spoofing technique, the Redirection Server will substitute the destination address of the subscriber's original service request in place of the Redirection Server's address as the source address in the header of the reply message. As such, the reply message from the redirection server will pass the checksum, as it would if it were a reply message from the destination of the subscriber's original service request.

However, another problem still remains. That is, when the NAS initially redirects the original service request to the Redirection Server, the destination address of the subscriber's original service request is typically lost. That is, in order to redirect the subscriber's request packets to the redirection server, the NAS will typically remove the data message (i.e., the request) from the subscriber's packet and place it in a new packet to be sent to the Redirection Server.

As a result, the packet sent to the redirection server will have the NAS's address as the source address and the redirection server's address as the destination address. The destination address of the subscriber's original service request will not be included in the new packet. The Redirection Server, therefore, will not be able to perform the spoofing technique as described above.

The present invention, however, enables the NAS to redirect packets received from the subscriber's computer system while keeping the destination address of the subscriber's original service request in tact. As a result, the Redirection Server is able to successfully perform the spoofing technique described above. That is, the Redirection Server is able to send a reply message to the subscriber and have the messages pass the subscriber's checksum as if the reply messages were sent from the destination of the subscriber's original service request.

More specifically, in one embodiment of the present invention, if the subscriber is found to be attempting to exceed their allowed ISP services, their packets are "encapsulated" within new packet and the new packet is sent to the Redirection Server. As a result, the destination address of the subscriber's original packet is preserved for the Redirection Server to use when performing the spoofing technique. In alternative embodiments, the Internet service request can be redirected by the NAS for additional reasons, without departing from the scope of the invention.

Figure 2:
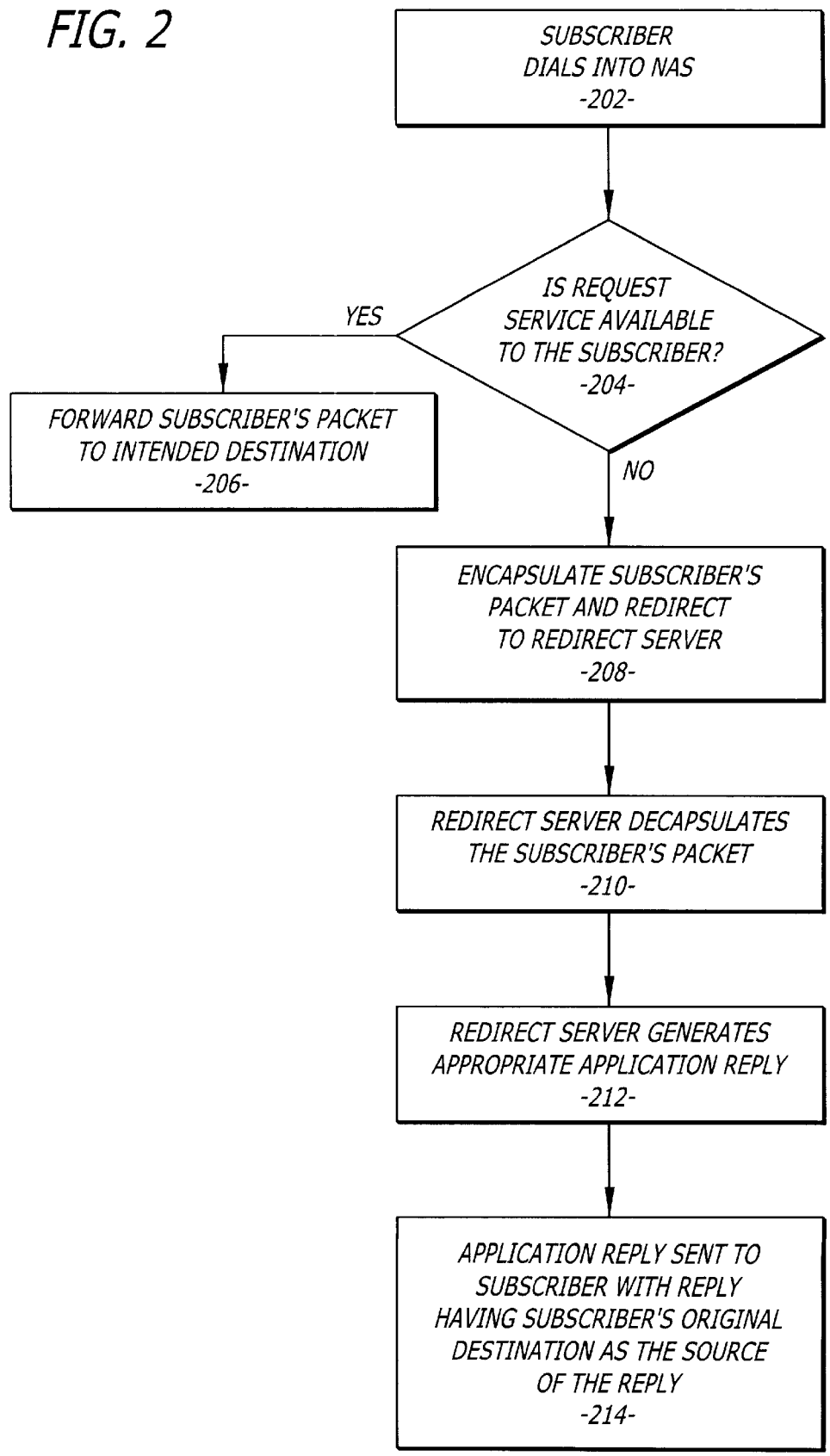
FIG. 2 illustrates a flow diagram describing the steps of the invention according to one embodiment.

FIG. 2 describes the steps performed to encapsulate packets received from a subscriber's computer system, according to one embodiment of the present invention. In step 202, a subscriber dials into a port of an ISP's local point-of-presence access server, otherwise referred to as a NAS, to gain access to the ISP. When a computer system is connected to a network it is commonly referred to as a node.

After the subscriber has dialed into the NAS, the subscriber's node and the NAS will establish a serial connection, typically via a point-to point protocol (PPP). During an authentication phase of the PPP, the subscriber will typically provide the NAS with a user name. The NAS, in response, will forward the user name onto an authentication server. The authentication server, in response, will inform the NAS which Internet services are available to the respective subscriber.

After the connection between the subscriber's node and the NAS has been established, the subscriber may transmit an Internet service request. For example, the subscriber may attempt to access the WWW. As discussed above, the service request will be sent to the NAS via a packet of information. In the case of the Internet Transmission Control Protocol/Internet Protocol (TCP/IP) suite, the packets are provided in an IP format.

In step 204, the NAS examines the packet received from the subscriber to determine if the subscriber is attempting to access an Internet service that may not be allowed per the subscriber's ISP subscription. In one embodiment, the NAS may examine the destination port provided in the transport layer of the packet. The transport layer is the fourth of seven layer in the International Organization for Standardization's Open Systems Interconnection (OSI) model for standardizing computer-to-computer communications.

The destination port of the transport layer may indirectly indicate to the NAS what the type of service the subscriber is attempting to access. The NAS can compare the service request by the subscriber with the services that are available to the subscriber, as indicated by the authentication server during the authentication phase of the PPP.

If the service is available to the subscriber, in step 206 the NAS will forward the packets to their respective destinations. On the other hand, if the service is not available to the user, in step 208 the packet received from the subscriber is encapsulated in a new packet by the NAS and is forwarded to the Redirection Server.

Figure 3:
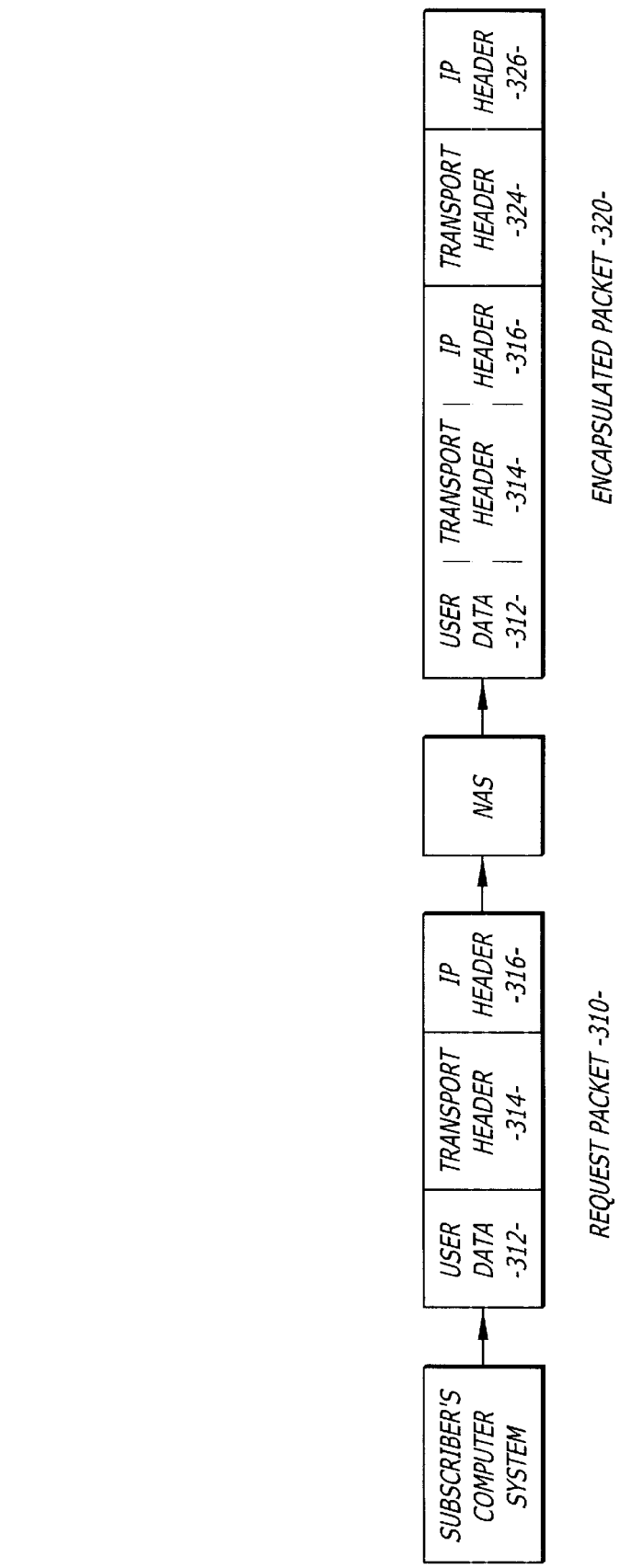
FIG. 3 illustrates an encapsulation technique performed according to one embodiment of the present invention.

FIG. 3 illustrates encapsulation, according to one embodiment of the present invention. For example, the request packet 310 sent by the subscriber's node, may include user data 312, a transport header 314 (which typically includes a destination port number (DPN) which indicates the requested service), and an IP header 316 (which is the network address of the packets destination).

The encapsulated packet 320 generated by the NAS, will include a new transport header 324 and an IP header 326 added onto the request packet 310. As a result, the original transport header 314 and IP header 316 will be subsumed into the user data layer of the encapsulated packet. Moreover, the added transport header 324 and the IP header 326 will both direct the encapsulated packet to the redirection server. Alternative encapsulation techniques may be used by the NAS, without departing from the scope of the invention, provided the destination address of the original service request is preserved.

By redirecting the subscriber's packet via encapsulation, the destination address of the subscriber's service request is preserved. As such, the Redirection Server is able to use the destination address of the original service request when performing the spoofing technique as described above.

Upon receipt of the encapsulated packet from the NAS, in step 210, the Redirection Server decapsulates the encapsulated packet. In step 212, the Redirection Server analyzes the subscriber's packet and creates an appropriate application response, which more specifically indicates to the subscriber why their Internet service request is being denied. In step 214, the reply message is placed in a reply packet to be returned to the subscriber.

In particular, the reply packet uses the destination address of the subscriber's original request packet 310 as the source address of the reply packet. As a result, the reply packet sent to the subscriber's node will pass the checksum as a reply message from the destination of the subscriber's original Internet service request.

In step 216, the reply packet is sent from the Redirection Server to the NAS, which forwards the reply packet to the subscriber's node. In step 218, the subscriber's computer system receives the reply packet. After performing a checksum on the reply packet, the subscriber's computer system displays the message generated by the Redirection Server, thereby presenting a more informative message explaining why the subscriber's Internet service request is denied.

In alternative embodiments, the present invention may be applicable to implementations of the invention in integrated circuits or chip sets, wireless implementations, switching systems products and transmission systems products. For purposes of this application, the terms switching systems products shall be taken to mean private branch exchange (PBXs), central office switching systems that interconnect subscribers, toll/tandem switching systems for interconnecting trunks between switching centers, and broadband core switches found at the center of a service provider's network that may be fed by broadband edge switches or access muxes, and associated signaling, and support systems and services.

The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

In addition, the NAS of the present invention may be configured to perform the encapsulation technique by having a set of computer instructions for Encapsulating and Sending Packets 18 stored on a computer readable medium, as is shown in FIG. 1. The computer readable medium can include, but is not limited to, any type of disk including floppy disks, optical disks, CD-ROMs, and magneto-optical disks, ROMs, RAMs, EPROMs, EEPROMs, magnetic or optical cards, or any type of media suitable for storing electronic instructions. Alternatively, the present invention could be implemented in discrete hardware components such as large-scale integrated circuits (LSI's), application-specific integrated circuits (ASIC's) or in firmware.

Moreover, in the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A method for selectively redirecting packets of information, said method comprising:
   a) receiving a first packet of information from a first source, said first packet of information having a first destination specified in a header of said first packet of information;
   b) examining said first packet to determine whether a service request of said first packet exceeds a pre-determined service level available to said first source; and
   c) processing said first packet of information to redirect said first packet of information to a second destination in place of said first destination if said first packet exceeds said pre-determined service level available to said first source, wherein said first packet of information is processed to be redirected to said second destination and include said first destination as specified in said header of said first packet of information, said step of processing enables said second destination to generate a reply packet to said first source, and said reply packet identifies said first destination as a source of said reply packet.

2. The method of claim 1, wherein the method is performed by a Network Access Server (NAS).

3. The method of claim 1, wherein said processing said first packet of information includes encapsulating said first packet of information into a second packet of information.

4. The method of claim 3, wherein said first packet includes a service request to an Internet Service Provider (ISP), and said reply packet generated by said second destination includes a message indicating said service request of said first packet exceeds said pre-determined service level available to said first source.

5. The method of claim 1 wherein the method is performed by a switching system product.

6. The method of claim 1 wherein the method is performed by a transmissions system product.

7. A computer-readable medium having stored thereon a plurality of instructions, including a first set of instructions for selectively redirecting packets of information, said first set of instructions, when executed by a processor, cause said processor to perform:
   a) receiving a first packet of information from a first source, said first packet of information having a first destination specified in a header of said first packet of information;
   b) examining said first packet to determine whether a service request of said first packet exceeds a pre-determined service level available to said first source; and
   c) processing said first packet of information to redirect said first packet of information to a second destination in place of said first destination if said first packet exceeds said pre-determined service level available to said first source, wherein said first packet of information is processed to be redirected to said second destination and include said first destination as specified in said header of said first packet of information, said step of processing enables said second destination to generate a reply packet to said first source, and said reply packet identifies said first destination as a source of said reply packet.

8. The computer-readable medium of claim 7, wherein the first set of instructions are performed by a Network Access Server (NAS).

9. The computer-readable medium of claim 7, wherein said processing said first packet of information includes encapsulating said first packet of information into a second packet of information.

10. The computer-readable medium of claim 9, wherein said first packet includes a service request to an Internet Service Provider (ISP), and said reply packet generated by said second destination includes a message indicating said service request of said first packet exceeds said pre-determined service level available to said first source.

11. The computer-readable medium of claim 7 implemented on a switching system product.

12. The computer-readable medium of claim 7 implemented on a transmissions system product.

13. A Network Access System (NAS) comprising:
   a) a first device operable to receive a first packet of information from a first source, said first packet of information having a first destination specified in a header of said first packet of information;
   b) said first device operable to examine said first packet to determine whether a service request of said first packet exceeds a pre-determined service level available to said first source; and
   c) said first device further operable to process said first packet of information to redirect said first packet of information to a second destination in place of said first destination if said first packet exceeds said pre-determined service level available to said first source, said first packet of information is processed to be redirected to said second destination and include said first destination as specified in said header of said first packet of information, said step of processing enables said second destination to generate a reply packet to said first source, and said reply packet identifies said first destination as a source of said reply packet.

14. The NAS of claim 13, wherein said first device is further operable to encapsulate said first packet of information into a second packet of information and redirect said second packet of information to said second device.

15. The NAS of claim 14, wherein said first packet includes a service request to an Internet Service Provider (ISP), and said reply packet generated by said second destination includes a message indicating said service request of said first packet exceeds said pre-determined service level available to said first source.

16. The NAS of claim 13 wherein the NAS comprises a switching system product.

17. The NAS of claim 13 wherein the NAS comprises a transmissions system product.

18. A computer-readable medium having stored thereon a plurality of instructions, including a first set of instructions for redirecting packets of information, said first set of instructions, when executed by a processor, cause said processor to perform:
   a) receiving, at a first server, a packet from a client, the packet including a header that identifies a second server as the destination of the packet;
   b) examining the packet to determine whether a service request associated with the packet exceeds a pre-determined service level available to the client;
   c) preserving the destination of the packet by encapsulating the packet within a new packet; and
   d) if said service request associated with the packet exceeds said predetermined service level available to the client, redirecting the new packet to a third server in place of the second server, said encapsulating the packet within the new packet enables the third server to generate a reply packet to the client, wherein the reply packet identifies the second server as the source of the reply packet.

19. The computer-readable medium of claim 18, wherein the first set of instructions are performed by a Network Access Server (NAS).

20. The computer-readable medium of claim 18, wherein the packet includes a service request to an Internet Service Provider (ISP), and the reply packet generated by the third server includes a message indicating the service request of the packet exceeds the pre-determined service level available to the client.

21. The computer-readable medium of claim 18 implemented on a switching system product.

22. The computer-readable medium of claim 18 implemented on a transmissions system product.

23. A Network Access System (NAS) comprising:
   a) a first server operable to receive a packet of information from a client, the packet of information including a header that identifies a second server as the destination of the packet;
   b) said first server operable to examine the packet to determine whether a service request associated with the packet exceeds a pre-determined service level available to the client; and
   c) said first server further operable to preserve the destination of the packet by encapsulating the packet within a new packet; and
   d) if said service request associated with the packet exceeds said predetermined service level available to the client, said first server further operable to redirect the new packet to a third server in place of the second server, the encapsulating the packet within the new packet enables the third server to generate a reply packet to the client, wherein the reply identifies the second server as the source of the reply packet.

24. The NAS of claim 23, wherein the packet includes a service request to an Internet Service Provider (ISP), and the reply packet generated by the third server includes a message indicating the service request of the packet exceeds said pre-determined service level available to the client.

25. The NAS of claim 23 implemented on a switching system product.

26. The NAS of claim 23 implemented on a transmissions system product.

27. An apparatus, comprising:
   a) means for receiving, at a first server, a packet from a client, the packet including a header that identifies a second server as the destination of the packet;
   b) means for examining the packet to determine whether a service request associated with the packet exceeds a pre-determined service level available to the client;
   c) means for preserving the destination of the packet by encapsulating the packet within a new packet; and
   d) means for determining that if said service request associated with the packet exceeds said predetermined service level available to the client, redirecting the new packet to a third server in place of the second server, said encapsulating the packet within the new packet enables the third server to generate a reply packet to the client, wherein the reply packet identifies the second server as the source of the reply packet.

28. The apparatus of claim 27, wherein the apparatus comprises a Network Access Server (NAS).

29. The apparatus of claim 27, wherein the packet includes a service request to an Internet Service Provider (ISP), and the reply packet generated by the third server includes a message indicating the service request of the packet exceeds the pre-determined service level available to the client.

30. The apparatus of claim 27 implemented on a switching system product.

31. The apparatus of claim 27 implemented on a transmissions system product.

32. A data signal embodied in a propagation medium, the data signal including a plurality of instructions, which when executed by a processor, cause the processor to:
   a) receive, at a first server, a packet from a client, the packet including a header that identifies a second server as the destination of the packet;
   c) examine the packet to determine whether a service request associated with the packet exceeds a pre-determined service level available to the client;
   c) preserve the destination of the packet by encapsulating the packet within a new packet; and
   d) if said service request associated with the packet exceeds said predetermined service level available to the client, redirect the new packet to a third server in place of the second server, said encapsulating the packet within the new packet enables the third server to generate a reply packet to the client, wherein the reply packet identifies the second server as the source of the reply packet.

33. The data signal of claim 32, wherein the plurality of instructions are executed by a Network Access Server (NAS).

34. The data signal of claim 32, wherein the packet includes a service request to an Internet Service Provider (ISP), and the reply packet generated by the third server includes a message indicating the service request of the packet exceeds the pre-determined service level available to the client.

35. The data signal of claim 32 implemented on a switching system product.

36. The data signal of claim 32 implemented on a transmissions system product.

37. A first network device that selectively redirects a packet that is transmitted from a client, where the packet identifies a second network device in a destination field of a header that is associated with the packet, in order to facilitate providing an indication of denial of access to a service associated with the packet, comprising:
   a) at least one port through which the packet of information is received;
   b) processing circuitry that assists examination of the packet to determine whether the service associated with the packet is available to the client; and
   c) redirection circuitry that causes generation of a new packet that encapsulates the packet, and transmission of the new packet to a third network device in place of the second network device if the service associated with the packet is determined to be unavailable to the client, whereby said third network device is facilitated in providing, for transmission to the client, a reply packet that identifies the second network device in a source field of a header that is associated with the reply packet.

38. The apparatus of claim 37, wherein the first network device comprises a Network Access Server (NAS).

39. The first network device of claim 37, wherein said first packet includes a service request to an Internet Service Provider (ISP), and said reply packet generated by said third network device includes a message indicating said service request of said first packet exceeds a service level available to the client.

40. The first device of claim 37 implemented on a switching system product.

41. The first device of claim 37 implemented on a transmissions system product.

42. A method for selectively redirecting a packet that is transmitted from a client, where the packet identifies a first network device in a destination field of a header that is associated with the packet, in order to facilitate providing an indication of denial of access to a service associated with the packet, comprising the steps of:
   receiving the packet at a second network device;
   examining the packet to determine whether the service associated with the packet is available to the client; and
   if the service associated with the packet is determined to be unavailable to the client, encapsulating the packet in a new packet and transmitting the new packet to a third network device in place of the first network device, whereby said third network device is facilitated in providing, for transmission to the client, a reply packet that identifies the second network device in a source field of a header that is associated with the reply packet.

43. The method of claim 42, wherein the method is performed by a Network Access Server (NAS).

44. The method of claim 42, wherein the packet includes a service request to an Internet Service Provider (ISP), and the reply packet generated by the third network device includes a message indicating the service request of the packet exceeds a service level available to the client.

45. The method of claim 42 wherein the method is performed by a switching system product.

46. The method of claim 42, wherein the method is performed by a transmissions system product.

\* \* \* \* \*

UNITED STATES PATENT AND TRADEMARK OFFICE
CERTIFICATE OF CORRECTION

PATENT NO. : 6,247,054 B1  Page 1 of 1
DATED : June 12, 2001
INVENTOR(S) : Malkin It is certified that error appears in the above-identified patent and that said Letters Patent is hereby corrected as shown below:

Column 8, claim 32,
Line 52, delete "c)" and insert -- b) --.

Column 9, claim 38,
Line 30, delete "apparatus" and insert -- first network device --.

Column 10, claim 40,
Line 1, after "The first" insert -- network --.

Column 10, claim 41,
Line 3, after "The first" insert -- network --.

Signed and Sealed this

Twenty-seventh Day of November, 2001

*Attest:*

NICHOLAS P. GODICI
*Attesting Officer*  *Acting Director of the United States Patent and Trademark Office*